Patented May 27, 1924.

1,495,789

UNITED STATES PATENT OFFICE.

WILLIAM A. HAMOR, OF NEW KENSINGTON, AND EDWIN R. HARDING, OF PITTSBURGH, PENNSYLVANIA, ASSIGNORS TO H. J. HEINZ COMPANY, OF PITTSBURGH, PENNSYLVANIA, A CORPORATION OF PENNSYLVANIA.

FOOD PRODUCT.

REISSUED

No Drawing.   Application filed July 28, 1923. Serial No. 654,450.

*To all whom it may concern:*

Be it known that we, WILLIAM A. HAMOR, residing at New Kensington, Westmoreland County, Pennsylvania, and EDWIN R. HARDING, residing at Pittsburgh, in the county of Allegheny and State of Pennsylvania, citizens of the United States, have invented or discovered certain new and useful Improvements in Food Products, of which improvements the following is a specification.

Our invention relates to artificially compounded foods, more particularly to artificially compounded cereal foods. It consists in the addition to nutritive material of cellulose in relatively pure condition. The object which we have in view is to produce foods which, on account of a high content of indigestible cellulosic matter, shall have desirable and healthful laxative properties, and shall at the same time be relatively free of objectionable irritating effect upon the digestive organs. Invention is found both in the product and in the method of its production.

It is well known that foods which contain cellulose in relatively great amount, such as fibrous vegetables, and cereal foods prepared from grains with the bran still adhering to it have great therapeutic value, in relieving chronic constipation and in correcting the pathological conditions consequent upon constipation. The beneficial laxative action which these foods bring about is due to large degree to the cellulose which they contain.

Cellulose is indigestible, and it passes through the alimentary canal unacted upon by the digestive enzymes and unabsorbed. Its function in relation to digestion is mechanical. Being present in food, it gives bulk to the waste material passing away through the intestines. This bulkiness of material stimulates muscular activity in the intestines, corrects intestinal stasis, and brings about regular evacuation of the bowels. And, together with the characteristic of bulkiness, is the further characteristic which cellulose possesses of being in high degree an absorbent of water. By virtue of this characteristic it brings into the intestines large quantities of water, and this too tends to facilitate bowel evacuation.

We have remarked that cellulose-containing foods are laxative, and have mentioned cereal foods particularly in which the bran is allowed to remain and to become an ingredient of the food product. The bran, unless purposely removed, adheres to the kernel of the grain. Bran-containing cereals have in recent years come into very extensive use, as additions to the human dietary. Whole-wheat bread, bran bread, and bran-containing breakfast foods are familiar instances. We would mention too in this connection artificially compounded breakfast foods in which the bran content has been increased beyond normal, by additions of bran alone. Bran contains cellulose, but it is not pure cellulose. Indeed cellulose forms but a minor part of the whole substance of bran. To many people bran is, because of its strong flavor and harsh mealy consistency, distasteful. Furthermore, bran contains hard, sharp, indigestible particles which, when the bran content of foods is artificially increased, tend to cause too great irritation of the delicate linings of the alimentary canal. Physicians often on that account are obliged to advise against a too liberal use of bran in diet.

We employ as an ingredient and diluent in the preparation of foods, not bran, with its objectionable properties of the nature indicated, but pure or substantially pure cellulose in finely divided pulverulent or semifibrous condition and free of the strong taste of bran and free of sharp, irritation-causing particles.

Suitable sources, from which cellulose in requisite condition may be derived, are corn-cobs, cotton, cotton linters, and wood pulp. These materials are all of them cheap and abundant. The cellulose which they contain may be separated and in separation may be brought to satisfactory physical form by various well known methods. For example, the cellulose may be derived from cotton linters by treating the linters first with an alkali, then with a bleaching agent, and finally with a mineral acid of proper concentration, and the cellulose so obtained will be obtained in powdered form suitable for our purposes.

It is not necessary for our purposes that the derived substance be entirely pure natural cellulose. Some of the cellulose of the raw material may have been converted into hydrated cellulose, or into some other insoluble first products of the hydrolysis of cellulose. In defining our invention we mean to include in the term cellulose a material which, otherwise responsive to definition, may contain an intermixture of material of the character indicated. In any case, however, it is free of malflavor and of sharp irritation-producing particles.

We do not, in the practice of our invention, confine ourselves to the sources of cellulose which we have particularly indicated, but intend to include in it the use of cellulosic residues prepared in other ways and from other raw materials. We may, for example, employ cellulose recovered in substantially pure condition by precipitation or by evaporation from a solution of cellulose in a suitable solvent. Other materials are available, and other methods of extraction, to the limits of the knowledge of industrial chemistry.

Cellulose prepared in such manner as we have indicated, itself insoluble and tasteless, bland and soft, may be used widely as a diluent in the preparation of foods, and this for the purpose already explained. And our invention in its broader aspect is found in the addition of cellulose in the condition indicated to alimentary substances generally, to constitute a food product. The cellulose may be added to the alimentary substance at any stage in the course of its preparation. If the article be one prepared by cooking, the cellulose may be added before or at the beginning of the cooking operation, stirring or mixing it in with the food, in such manner that a uniform commingling of the cellulosic material with the food is effected. Or the cellulosic material may be added while cooking is in progress, or after cooking has been completed, taking care to obtain in any case a thorough and uniform mixture. If the cellulose be, as preferably it is, in pulverulent form, no difficulty will be found in making a uniform mixture with any alimentary substance not too thin or watery.

Having obtained a substantially uniform mixture of the cellulosic material with the alimentary substance, the resulting food product may, according to its nature, be eaten as it is, or it may be subjected to any further process of food preparation, such as drying, baking, toasting. Being dried or otherwise brought to proper consistency, it may be flaked or otherwise more finely divided. And it may of course be canned or otherwise prepared for shipment and storage.

The product will in any case have essentially the same flavor, taste, and it may be consistency too, as the alimentary substance, without the addition of cellulose.

Cellulose of the proper purity and form may be added to foodstuffs in great variety, for the purpose of giving to them laxative properties, and that without detraction from their palatability. Alimentary substances well suited to carry such additions of cellulose are all classes of cereal products commonly prepared for the table by baking, that is to say, flour, meal, and the like, used in making bread, cake, etc. Other suitable substances are cereal breakfast foods, both those of the ready-to-serve type, and of the type which requires cooking, as farina, for example, and oat meal. Canned foods of many kinds are adaptable to the practice of our invention: prepared macaroni, for instance, spaghetti, baked beans, thick soups, etc. Soup powders also may be compounded with our cellulosic material. And it is quite possible to use many other foodstuffs as media, for carrying the added cellulose, and the cellulose may be added either in preparation of a product for the market, or in the preparation of food for the table.

Our invention in its more specific aspect has to do with a breakfast food. We contemplate a food product which eaten regularly will have value in keeping the intestines free and in that respect in good condition. A food for regular use should be palatable, and of such form, flavor, and natural appeal to the taste that one does not tire of its daily consumption. It should of course be easily and cheaply available, the year round. And in a cereal breakfast food these requisites may be most fully and satisfactorily met and fulfilled.

In the preparation of cereal breakfast foods, we add to the cereal cellulose to the amount of about 10% of the dry weight of the cereal. This gives a product a little higher in cellulose than ordinary wheat bran. The relative amount of the cellulose added may of course be greater or less than that indicated. Using any suitable cereal, such as rice, as a base, a product may be prepared in a toasted flake form containing as much as 30% of cellulose by weight. Even in this high concentration the somewhat mealy taste of the cellulose is just barely noticeable, and the product as such is suitable for serving with milk or cream. However, such a product is best suited for mixing at the time of serving with such cooked breakfast foods as oatmeal or farina, to give them an increased cellulose content with its desirable laxative effect. A product containing about 10% of cellulose, on the other hand, is better suited for liberal consumption when served by itself.

We claim as our invention:

1. A food product compounded of an alimentary substance and finely divided substantially pure cellulose, 2. A food product compounded of an alimentary substance and cellulose in pulverulent condition, free of sharp particles which are indigestible.

3. A food product compounded of a cereal food and cellulose in pulverulent condition, free of sharp particles which are indigestible.

In testimony whereof we have hereunto set our hands.

WILLIAM A. HAMOR.
EDWIN R. HARDING.

Witnesses:
  LOIS WHITTLE,
  B. SCHAFFER.